US008892698B2

United States Patent
Baptist et al.

(10) Patent No.: US 8,892,698 B2
(45) Date of Patent: Nov. 18, 2014

(54) OBJECT INTERFACE TO A DISPERSED DATA STORAGE NETWORK

(71) Applicant: Cleversafe, Inc., Chicago, IL (US)

(72) Inventors: Andrew Baptist, Mt. Pleasant, WI (US); Srinivas Palthepu, Naperville, IL (US); S. Christopher Gladwin, Chicago, IL (US); Greg Dhuse, Chicago, IL (US); Zachary J. Mark, Chicago, IL (US); Vance T. Thornton, Columbus, OH (US); John Quigley, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 14/021,037

(22) Filed: Sep. 9, 2013

(65) Prior Publication Data

US 2014/0012899 A1    Jan. 9, 2014

Related U.S. Application Data

(60) Division of application No. 12/648,528, filed on Dec. 29, 2009, now Pat. No. 8,533,256, which is a continuation-in-part of application No. 12/218,200, filed on Jul. 14, 2008, now Pat. No. 8,209,363, which is a continuation-in-part of application No. 11/973,613, filed on Oct. 9, 2007, now Pat. No. 8,285,878.

(60) Provisional application No. 61/141,312, filed on Dec. 30, 2008.

(51) Int. Cl.
*G06F 15/16* (2006.01)
*G06F 17/30* (2006.01)

(52) U.S. Cl.
CPC .... *G06F 17/30194* (2013.01); *G06F 17/30126* (2013.01)
USPC ............ 709/220; 709/224; 709/226; 714/752

(58) Field of Classification Search
CPC ..... H04L 29/08072; H04L 29/06; G06G 3/67
USPC .................................. 709/220, 226, 228, 224
See application file for complete search history.

(56) References Cited

U.S. PATENT DOCUMENTS

| 7,240,236 | B2* | 7/2007 | Cutts et al. ..................... 714/6.1 |
| 7,546,427 | B2* | 6/2009 | Gladwin et al. .............. 711/154 |
| 7,636,724 | B2 | 12/2009 | de la Torre et al. |
| 8,209,363 | B2* | 6/2012 | Palthepu et al. .............. 707/822 |
| 8,478,865 | B2* | 7/2013 | Quigley et al. ............... 709/224 |
| 8,578,205 | B2* | 11/2013 | Leggette et al. .............. 714/6.2 |
| 8,683,119 | B2* | 3/2014 | Leggette ....................... 711/114 |

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

*Primary Examiner* — Khanh Dinh

(74) *Attorney, Agent, or Firm* — Garlick & Markison; Timothy W. Markison; Shayne X. Short

(57) ABSTRACT

A data object interface to a dispersed data storage network is disclosed. The disclosed interface accepts read and write commands from a client computer and generates network commands that are forwarded to slice servers that form the storage component of the dispersed data storage network. The slice servers then fulfill the read and write commands.

6 Claims, 20 Drawing Sheets

OBJECT INTERFACE TO A DISPERSED DATA STORAGE NETWORK

CROSS-REFERENCE TO RELATED APPLICATIONS

The present U.S. Utility patent application claims priority pursuant to 35 U.S.C. §120, as a divisional, to the following U.S. Utility patent application which is hereby incorporated herein by reference in its entirety and made part of the present U.S. Utility patent application for all purposes:

1. U.S. Utility application Ser. No. 12/648,528, entitled "OBJECT INTERFACE TO A DISPERSED DATA STORAGE NETWORK,", filed Dec. 29, 2009, pending, which claims priority to the following applications which are hereby incorporated herein by reference in their entirety and made part of the present U.S. Utility patent application for all purposes:
   a. Pursuant to 35 U.S.C. §119(e) to U.S. Provisional Application No. 61/141,312, entitled "OBJECT INTERFACE TO A DISPERSED DATA STORAGE NETWORK,", filed Dec. 30, 2008; and
   b. Pursuant to 35 U.S.C. §120, as a continuation-in-part (CIP), to U.S. Utility application Ser. No. 12/218,200, entitled "FILE SYSTEM ADAPTED FOR USE WITH A DISPERSED DATA STORAGE NETWORK,", filed Jul. 14, 2008, now U.S. Pat. No. 8,209,363, issued on Jun. 26, 2012, which is a continuation-in-part (CIP) to U.S. Utility application Ser. No. 11/973,613, filed Oct. 9, 2007, now U.S. Pat. No. 8,285,878, issued on Oct. 9, 2012.

The following applications are also incorporated by reference in their entirety:

1. U.S. Utility application Ser. No. 11/973,621, entitled "VIRTUALIZED DATA STORAGE VAULTS ON A DISPERSED DATA STORAGE NETWORK,", filed Oct. 9, 2007, now U.S. Pat. No. 7,904,475, issued on Mar. 8, 2011.

2. U.S. Utility application Ser. No. 11/973,622, entitled "SMART ACCESS TO A DISPERSED DATA STORAGE NETWORK,", filed Oct. 9, 2007, now U.S. Pat. No. 8,171,101, issued on May 1, 2012.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for reading data from and writing data to a dispersed data storage network.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in their home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple stripes, each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Files are usually organized in file systems, which are software components usually associated with an operating system. Typically, a file system provides means for creating, updating, maintaining, and hierarchically organizing digital data. A file system accepts digital data of arbitrary size, segments the digital data into fixed-size blocks, and maintains a record of precisely where on the physical media data is stored and what file the data is associated with. In addition, file systems provide hierarchical directory structures to better organize numerous files.

Various interfaces to storage devices are also well known in the art. For example, Small Computer System Interface ("SCSI") is a well known family of interfaces for connecting and transferring data between computers and peripherals, including storage. There are also a number of standards for transferring data between computers and storage area networks ("SAN"). For example, Fibre Channel is a networking technology that is primarily used to implement SANs. Fibre Channel SANS can be accessed through SCSI interfaces via Fibre Channel Protocol ("FCP"), which effectively bridges Fibre Channel to higher level protocols within SCSI. Internet Small Computer System Interface ("iSCSI"), which allows the use of the SCSI protocol over IP networks, is an alternative to FCP, and has been used to implement lower cost SANs using Ethernet instead of Fibre Channel as the physical connection. Interfaces for both FCP and iSCSI are available for many different operating systems, and both protocols are widely used. The iSCSI standard is described in "Java iSCSI Initiator," by Volker Wildi, and Internet Engineering Task Force RFC 3720, both of which are hereby incorporated by reference.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s'=s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Traditional disk-oriented file systems offer the ability to store and retrieve user-visible files, directories and their metadata. In addition to this data, and transparent to the file system user, is the file system metadata which is comprised of various elements of concern to the file system itself or its immediate execution context of the operating system kernel. File system metadata (often called the superblock in UNIX parlance) is composed of such things as the magic number identifying the file system, vital numbers describing geometry, statistics and behavioral tuning parameters and a pointer to the tree's root. This has various implications, the most crucial of which being that a file system cannot "bootstrap" itself, or bring itself online, if the superblock were to ever become corrupt.

Schemes for implementing dispersed data storage networks ("DDSNs"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Access to Cleversafe's DDSNs has been based on two paradigms, i.e., block-based (see U.S. patent application Ser. No. 11/973,613) or file-based access (see U.S. patent application Ser. No. 12/218,200) to DDSNs using Cleversafe's iSCSI interface. Using the block-based DDSN access, the iSCSI interface breaks up the data into fixed-size blocks to be stored on individual disk blocks on the DDSN, whereby the client's native file system is used for accessing the block-based data and to provide the user with the ability to aggregate these data blocks as files, directories, etc., i.e., in a manner more meaningful to a user. However, the scalability of block-based access is limited to small to mid-size DDSNs with a limited number of clients accessing the DDSN at any one time.

On the other hand, using file-based DDSN access provides the user with a virtual file system layer, whereby the iSCSI breaks larger file segments into smaller segments for storage on the DDSN. A file-based access provides the user with many of the traditional file system features, such as, for example, a hierarchical directory structure and meta-data describing certain attributes of the files or directories. However, while file-based DDSN access can be scaled to much larger DDSNs, it is prone to certain DDSN access conflicts. Particularly, whenever multiple clients simultaneously perform read, write and or delete operations on a file-access DDSN, problems of directory contention can be caused, i.e., conflicts in directory modification. Furthermore, file-systems provide many features that clients of virtual storage networks, such as Cleversafe's DDSN, simply do not need, such as the ability to organize the stored files in some fashion. Mostly, users of DDSNs are only interested in securely storing and retrieving individual digital objects.

Therefore, subsequent use and testing has revealed that additional improvements could be made in providing better performing and more accessible dispersed data storage technology. Accordingly, improved performance and accessibility can be achieved by providing clients with object-based access to DDSNs or a Dispersed Object Storage Network ("DOSN"), allowing clients to store and retrieve individual data objects independent of each other.

The concept of object storage was introduced in the early 1990s by a group of researchers at Carnegie Mellon University. Object storage is characterized by a higher level of abstraction compared to traditional block-based and file-based methods. Object storage is based on data objects that encapsulate user data, including the data, attributes and meta-data. Unlike the traditional methods of providing access to data organized as an array of unrelated blocks, object storage allows access to data by means of storage objects. A storage object is a virtual entity that groups data together that has been determined by the user to be logically related. Storage space for a storage object is allocated internally by the object storage device itself instead of the host-based file system.

The fundamentals of object storage and object-based storage devices are further described in "Object Storage: The Future Building Block for Storage Systems," by Michael Factor et al., and "Object-Based Storage Devices," by Christian Bandulet, both of which are hereby incorporated by reference.

OBJECTS OF THE INVENTION

Accordingly, it is an object of this invention to provide a system, apparatus, and method for implementing an object-based file system especially adapted for use with a dispersed data storage network.

Another object of the invention is to provide a system, apparatus, and method for implementing an object-based file system especially adapted for use with a dispersed data storage network, whereby a unique identifier is automatically and randomly generated for each data object.

Another object of the invention is to provide a system, apparatus, and method for implementing an object-based file system especially adapted for use with a dispersed data storage network, whereby the client user designates a name for each data object.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a data object interface to a dispersed data storage network. In one embodiment, a method of reading a data object for a dispersed data storage network is disclosed, along with a computer implementing the method. In this embodiment, data indicative of a data object to be read is received, and, based on the received data, an information record identifying the data object to be read is retrieved. The retrieved information record also identifies n data slices including data associated with the data object to be read. At least m data slices are then read from slice servers included in the dispersed data storage network, and the data object is assembled from the read data slices. In a further embodiment of the disclosed invention, the data indicative of the data object to be read is a unique identifier. In a separate embodiment of the disclosed invention, the data indicative of the data object to be read is a user supplied name, from which a unique identifier may be generated.

In a separate embodiment of the disclosed invention, a method of writing a data object to a dispersed data storage network is disclosed, along with a computer implementing the method. In this embodiment, a data object identifier is assigned to a data object to be written to the dispersed data storage network. An information dispersal algorithm is then applied to the data object to generate a plurality of data slices. Each of the generated data slices is transmitted to a separate slice server, which stores the respective data slices. In a further embodiment, a name may be accepted, and a data object identifier generated by applying a hashing function to the name. In a separate embodiment, the data object identifier may be randomly generated.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
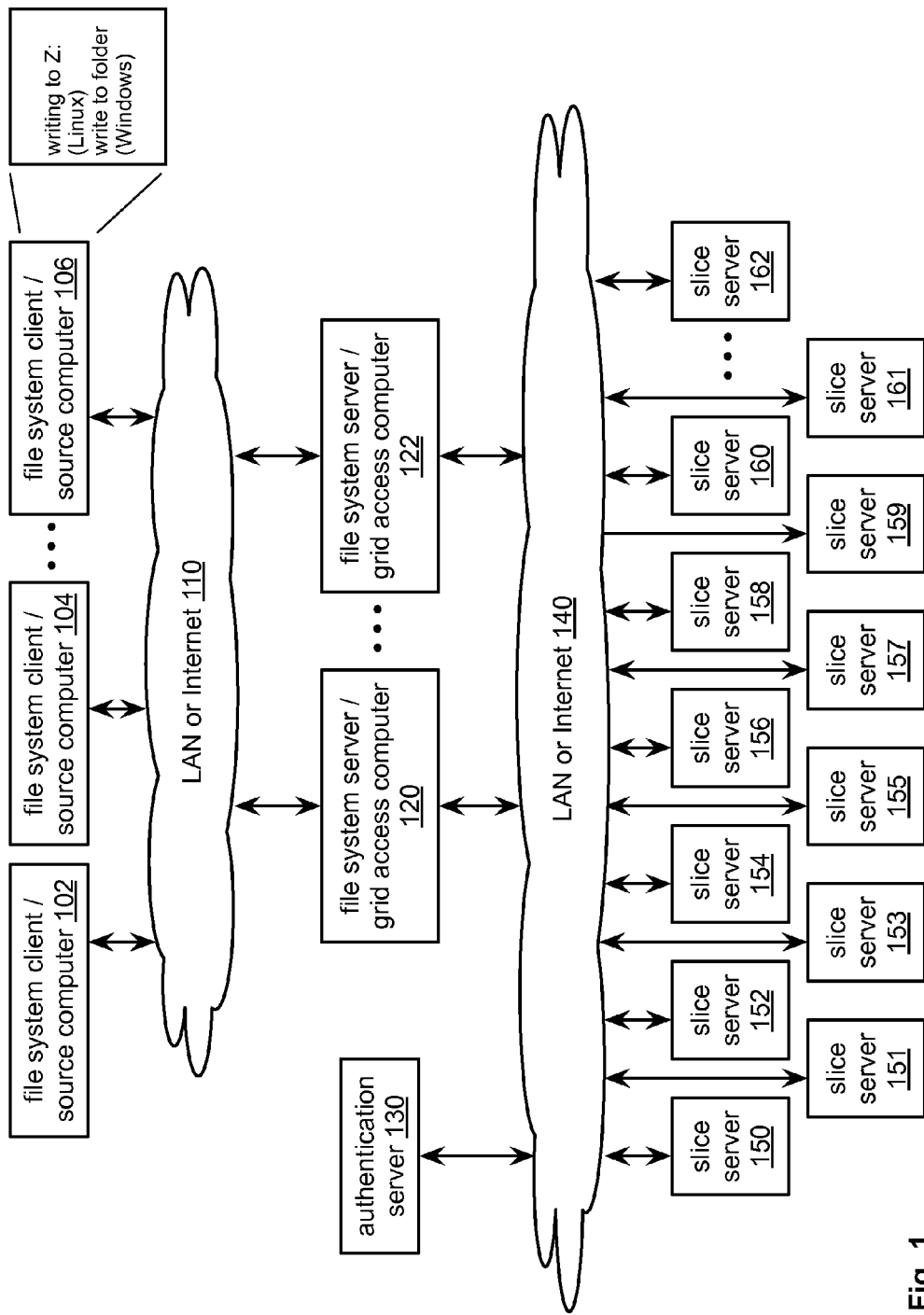
FIG. 1 is a network diagram of a dispersed data storage network constructed in accordance with an embodiment of the disclosed invention.

Turning to the Figures, and to FIG. 1 in particular, a distributed computer system implementing a dispersed data storage network 100 is shown. An arbitrary number of slice servers 150-162 store data slices sent to them by networked source computers 102, 104, and 106. As illustrated, some number of grid access computers 120 and 122 serve as networked iSCSI Targets for an arbitrary number of source computers 102, 104, and 106, which are configured as iSCSI Initiators.

As explained herein, the disclosed invention allows a dispersed data storage network to be presented as a block device which can be mounted as a network drive by compatible operating systems. As illustrated, the dispersed data storage network is accessed by the source computers 102, 104, and 106, as an iSCSI Target. In particular, each source computer 102, 104, and 106 writes data blocks to an iSCSI Initiator, which forms network commands that are directed to an associated iSCSI Target, which is in this case implemented on grid access computers 120 and 122. Note that an iSCSI Target could be implemented on the source computers 102, 104, and 106, which would make the grid access computers 120 and 122 unnecessary. In addition, a different storage protocol, such as FCP or ATA over Ethernet could be used, or a device driver could be implemented directly on the source computers 102, 104, and 106 to present the dispersed data storage network as a mounted drive. The iSCSI implementation discussed herein is only used as a device to aid the understanding of the disclosed invention by a person of ordinary skill in the art.

Figure 2:
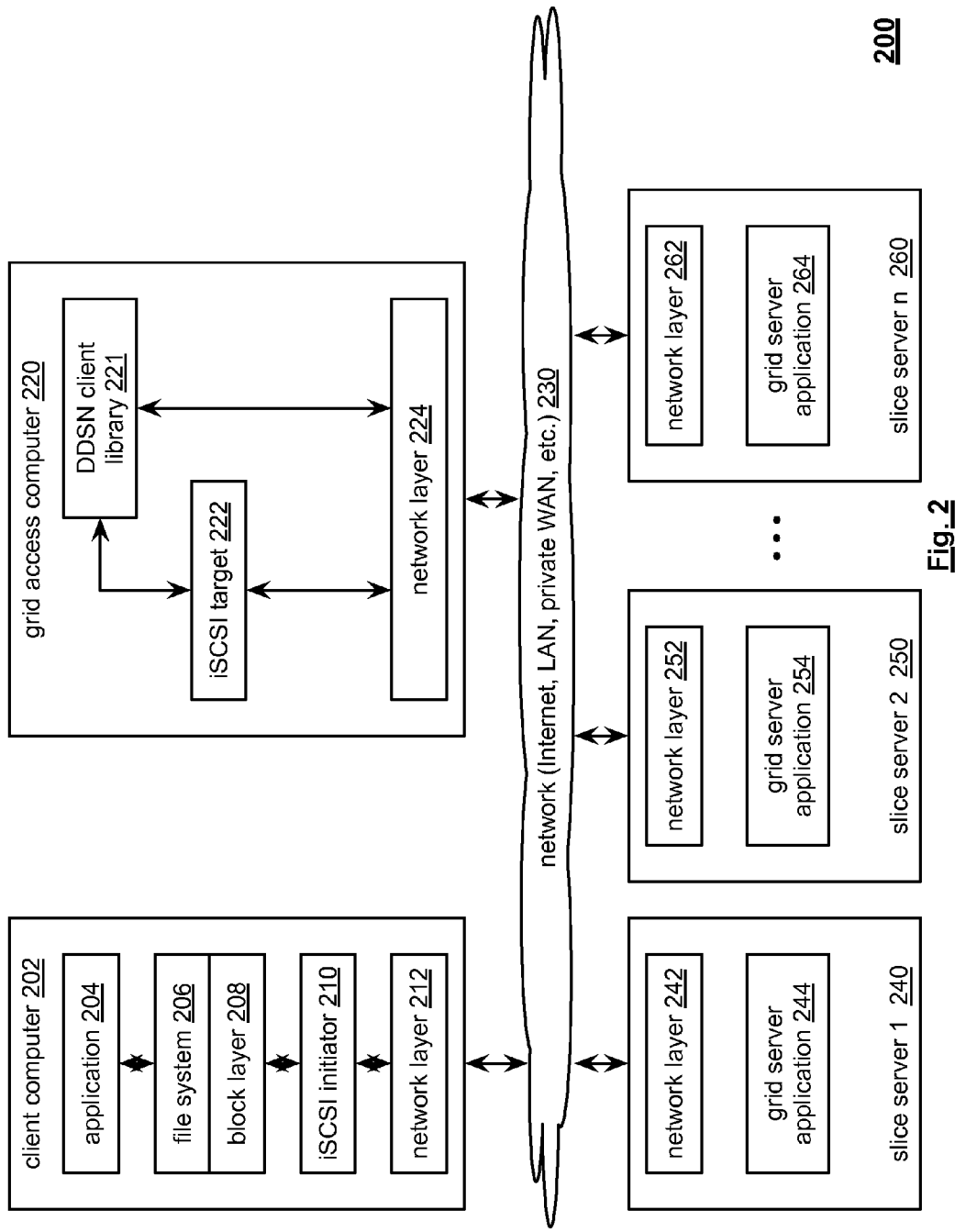
FIG. 2 is a block diagram illustrating the interoperation of different software components used to implement a dispersed data storage network constructed in accordance with an embodiment of the disclosed invention.

FIG. 2 illustrates a distributed computer system implementing a dispersed data storage network 200. The illustrated system consists of a client/user computer 202, a grid access computer 220, and some number of slice servers 240, 250, and 260. Within the client computer 202 an application program 204 accesses an operating system including a file system 206. The operating system may include a separate block layer 208, meaning an interface to block devices such as storage device drivers, or the functionality of the block layer 208 may be incorporated into the file system 206. In either case, read and write commands directed to the file system are forwarded to an iSCSI Initiator 210, which formulates network commands that are carried out by a network layer 212, which is also part of the operating system operating on the client computer 202.

As illustrated, the iSCSI Initiator 210 operating on the client computer 202 is configured to operate with iSCSI Target 222, resident on grid access computer 220. The iSCSI Target 222 receives network commands from the iSCSI Initiator 210 via a separate network layer 224 operating on the grid access computer 220. As opposed to a standard iSCSI Target, which would merely store data on one or more drives accessible to the iSCSI Target, the iSCSI Target 222 operating on the grid access computer 220 is configured to operate with a dispersed data storage network. As will be explained in more detail in the sections that follow, the iSCSI Target 222 communicates with DDSN Client Library 221, which implements a data dispersal algorithm in accordance with the commands received from the iSCSI Initiator 210, and either retrieves data from appropriate slice servers 240, 250, and 260 or writes data to the same. Each slice server 240, 250, and 260 also contains a grid server application 244, 254, and 264 that stores and retrieves data slices in accordance with network commands received from the grid access computer 220 via the network layers 242, 252, and 262 of the respective slice servers 240, 250, and 260.

Figure 3:
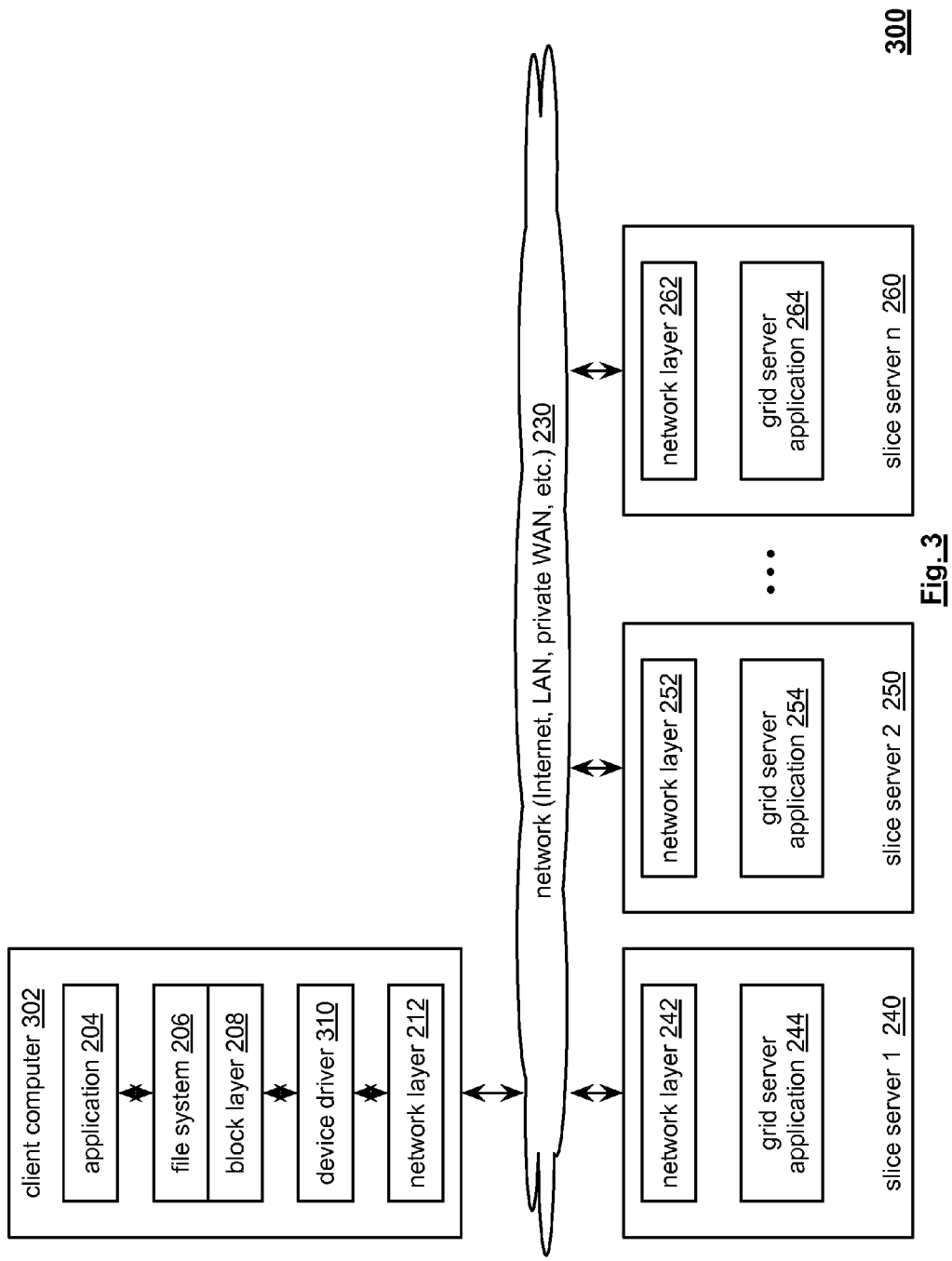
FIG. 3 is a block diagram illustrating the interoperation of different software components used to implement a dispersed data storage network constructed in accordance with a different embodiment of the disclosed invention.

FIG. 3 illustrates a slightly different distributed computer system implementing a dispersed data storage network 300. The illustrated system is identical to that shown in FIG. 2, except that the grid access computer 220 has been entirely removed, and, instead of using an iSCSI Target 222 to implement a block interface to the dispersed data storage network, a device driver 310 resident on the client user computer 302 implements the block interface. In this implementation, the device driver 310 receives read and write commands from the file system 206. The device driver 310 is configured to fulfill read and write commands through the dispersed data storage network 240, 250, and 260. Like the iSCSI Target 222 of the previously discussed implementation, the device driver 310 implements a data dispersal algorithm in accordance with the commands received from the file system 206, and either retrieves data from appropriate slice servers 240, 250, and 260 or writes data to the same. The embodiment of FIG. 3 is otherwise similar to that of FIG. 2.

Figure 4:
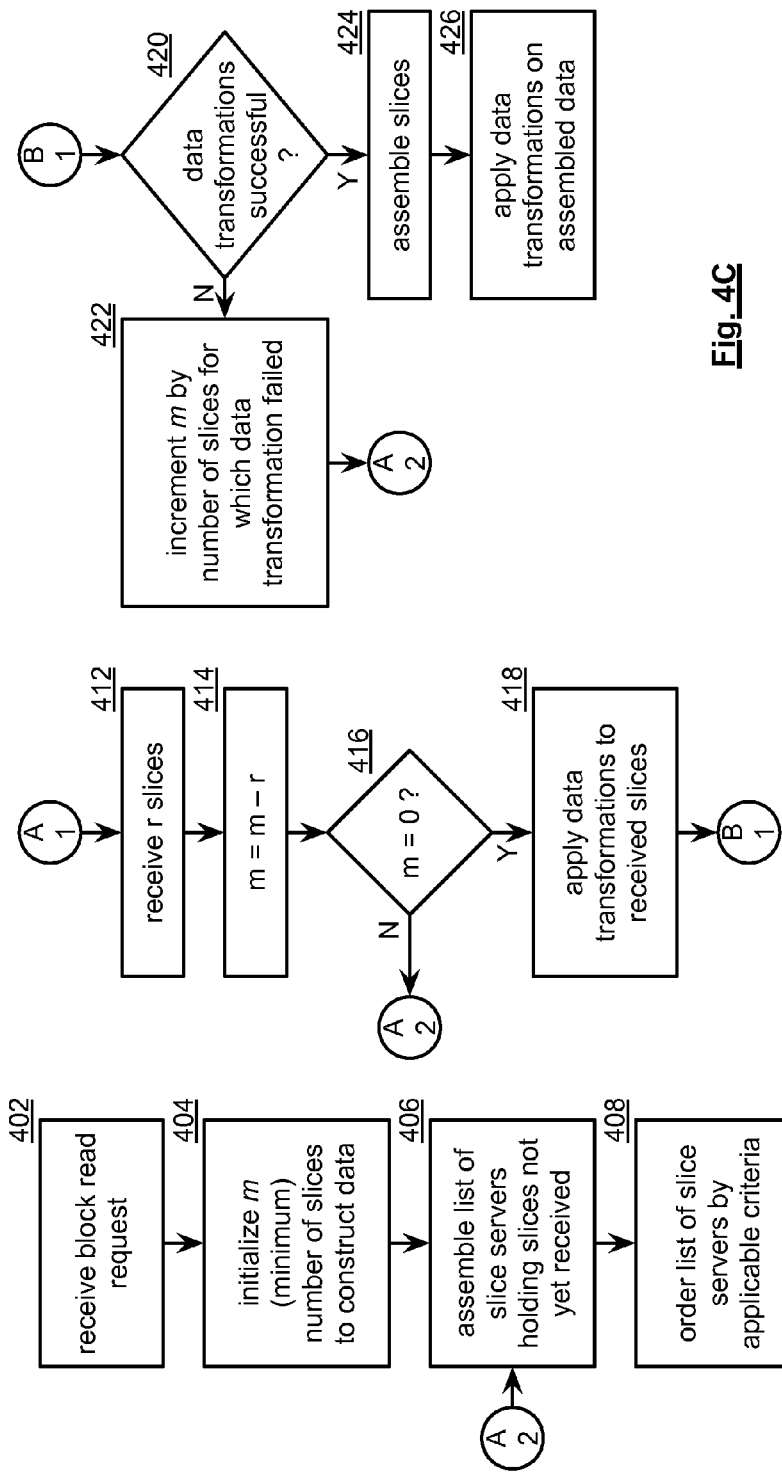
FIGS. 4A-4C collectively illustrate a read operation from a dispersed data storage network constructed in accordance with an embodiment of the disclosed invention.

FIGS. 4A-4C show the process by which an iSCSI Target, or other data dispersal/assembly software component, constructed in accordance with the disclosed invention could handle a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,621, titled "Virtualized Data Storage Vaults on a Dispersed Data Storage Network," filed on Oct. 9, 2007 assigned to Cleversafe, Inc., and hereby incorporated by reference in its entirety. In step 404, the variable m is initialized to the minimum number of slices required to construct the requested data. As described herein, for each successfully received and validated slice, m is decremented.

In step 406, a list of slice servers each holding one required data slice that has yet to be received is assembled, and in step 408, the list is ordered by any applicable criteria. Further information on criteria by which the list may be ordered is contained in U.S. patent application Ser. No. 11/973,622, titled "Smart Access to a Dispersed Data Storage Network," filed on Oct. 9, 2007, assigned to Cleversafe, Inc., and hereby incorporated by reference in its entirety. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. Note that the number of received data slices r may be smaller than the number of requested data slices k. In step 416, m is compared to zero, and if m is not equal to zero, execution returns to step 406, and execution proceeds as normal from there. However, if m is equal to zero, a collection of data transformations may optionally be applied to the received slices in step 418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice may be been corrupted. However, if the applied data transformations were successful for all received data slices, the received slices are assembled into the requested block of data in step 424. The same or different data transformations may optionally be applied to the assembled data block in step 426, which completes the read process.

Figure 5:
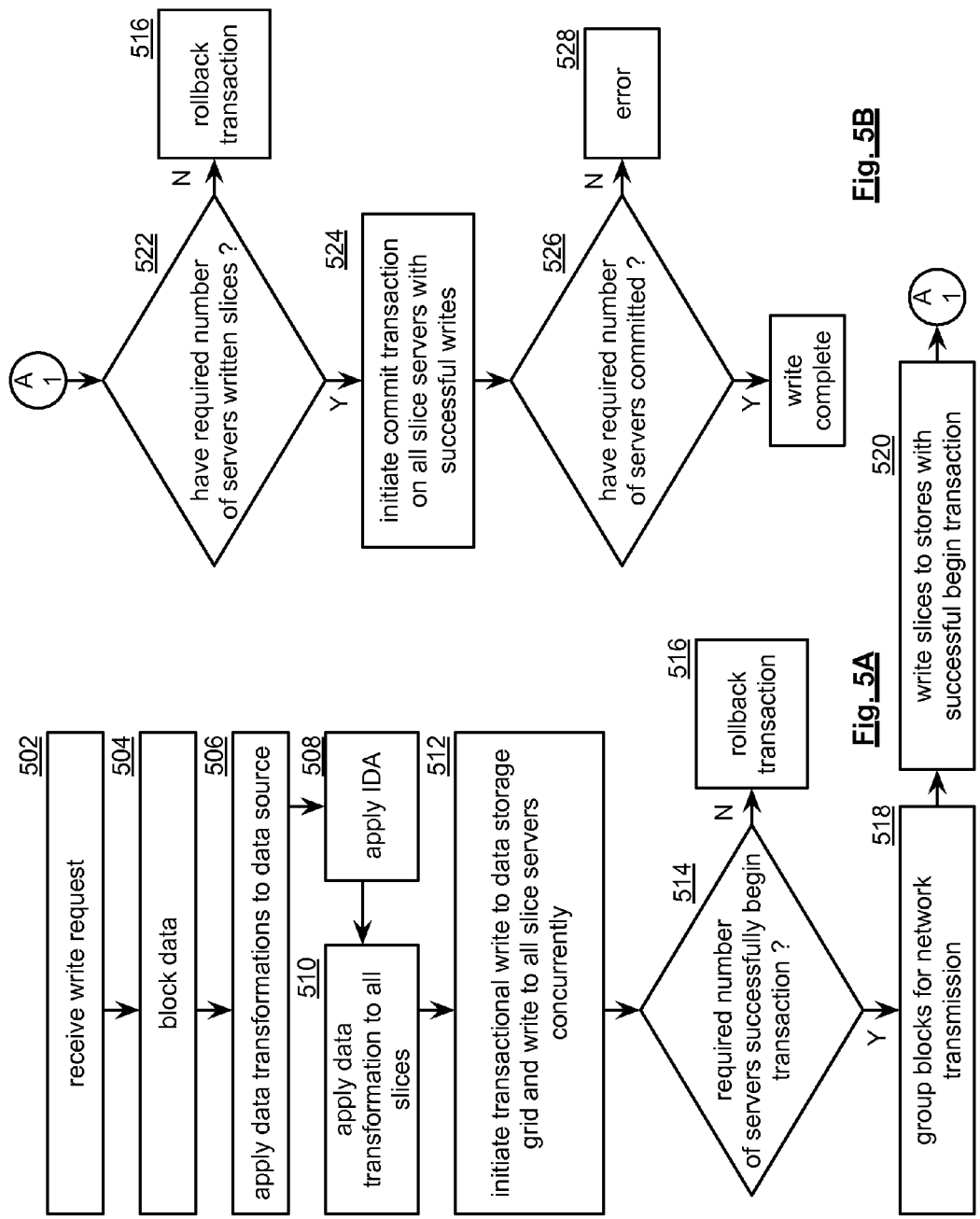
FIGS. 5A-5B collectively illustrate a write operation from a dispersed data storage network constructed in accordance with an embodiment of the disclosed invention.

In FIGS. 5A-5B, the process by which an iSCSI Target, or other data dispersal/assembly software component, constructed in accordance with the disclosed invention could handle a write request is illustrated. In step 502, a write request is received. Included in this write request is a data segment to be written that could span many fixed length blocks. In addition, the write request will contain information sufficient to determine which slice servers the data segment should be written to, as well as information required by the information dispersal algorithm to slice each block, i.e., the number of slices to be written, referred to as n, as well as the minimum number of slices that are required to recover the data, referred to as m. Further information on one method that can be used to associate data writes with particular slice servers is contained in U.S. patent application Ser. No. 11/973,621, titled "Virtualized Data Storage Vaults on a Dispersed Data Storage Network," filed on Oct. 9, 2007 and assigned to Cleversafe, Inc.

In step 504, the data segment is blocked into identical length fixed-size blocks. A number of data transformations may optionally be applied to each block in step 506, and an information dispersal algorithm is applied in step 508. In particular, the Cauchy Reed-Solomon dispersal algorithm could be applied to each block, resulting in a predetermined number of data slices. In step 510, a number of data transformations are optionally applied to each data slice.

In the disclosed system, writes are performed transactionally, meaning that all data slices must be successfully written before a write is deemed complete. In step 512, a write transaction is initiated to the data storage network. As discussed herein, all slice servers are simultaneously contacted, and in step 514, a confirmation that at least n receiving slice servers are prepared to begin the write transaction must be received, or the transaction is rolled back in step 516.

In step 518, blocks are grouped for transmission, and in step 520, data slices are transmitted to the slice servers that indicated their ability to receive and store slices. The number of slice servers that successfully received and stored their assigned data slices is checked in step 522, and if less than n slices are successfully stored, the transaction is rolled back in step 516. In step 524, a commit transaction is begun on all servers with successful writes. If the commit transaction fails, an error is logged in step 528.

Detailed Description of the Improved File System Adapted for Use with a Dispersed Data Storage Network In addition to the block-based interface described above, a dispersed data storage network could also be accessed through a specially designed file interface. The file interface disclosed below is especially designed to access a dispersed data storage network ("DDSN"), and preserves the advantages of the disclosed block-based interface while providing a number of further advantages. The block-based iSCSI interface is limited by the client initiator in terms of number of concurrent requests, caching behavior and handling of multiple users (both readers and writers). The file interface does not face these restrictions and can potentially provide better performance and allow multiple usage. Additionally the same vault could be accessed from a variety of types of clients such as smart phones or applets as well as traditional desktop machines. Further, to aid in user adoption, the disclosed DDSN file interface could be provided as a virtual file system interface, and higher level interfaces to commonly used network file systems, such as NFS, CIFS, WebDAV and FTP could be provided. In such an implementation, a user would notice little or no difference when accessing the DDSN than when accessing a file stored on her local drive.

The disclosed File/Object implementation dispenses of the need for file system metadata, while still maintaining the flexibility that file system metadata grants. This is achieved through clean separation of the file system representation logic (as implemented by File/Object) and the file system storage, as implemented by a quantity of slice servers. In one embodiment, this separation allows two key assumptions to be made regarding the data format of information stored on the DDSN without concern for the efficiency or durability of that format.

First, as all stored data is associated with a file vault, it can be assumed that the data source identifier for the root object associated a particular file value is fixed across the entire vault. As a result, the file-object layer is not required to consult any on-disk reference to determine where a particular file system object resides or what other objects reference it.

Second, all data source identifiers are large randomly generated numbers, such as a Universally Unique Identifier, as opposed to monotonically increasing references used in traditional file systems. Traditional file systems use monotonically increasing references as they allow for near instantaneous lookup of data related to an identified file when combined with traditional look-up table structures. However, for a file system especially adapted for use with a dispersed data storage network, the use of a random identifier relieves the File-Object system from having to track allocated and free identifiers, which is typically achieved through the use of a "bookkeeping" bit mask. This allows for the flexible increase or decrease of space allocated to a particular vault at any time, as there are no assumptions about the allocation of size at the time that a vault is created.

One feature of the disclosed DDSN File System ("DFS") is that it provides for the caching of directory objects and file system metadata. This provides a significant increase in performance and a significant decrease in network traffic; for instance, routine file system accesses do not require a directory object to be read from the DDSN multiple times, thereby allowing near instantaneous access after the directory is read the first time, and eliminating additional packets that would have resulted from reading the directory object from the DDSN multiple times. Depending on the implementation of the particular DDSN, a file system cache could reside on each client computer, or a grid access computer could maintain a file system cache for a plurality of client computers. Note that only file system objects, such as directory objects and file system metadata (i.e., metadata associated with directory objects and file objects), are cached; actual file data is not cached by the disclosed file system. Further note that file system metadata refers to data that describes a particular directory or file, such as the date and time that the referenced directory or file was last modified.

Another feature of the disclosed DFS is that all operations including create operations, read operations, update operations, and delete operations, are performed transactionally, meaning that every step of an operation is verified before it is deemed complete, and any failed operation is "rolled back." For example, when an update operation for a particular data segment is performed, every updated data slice associated with the updated data segment must be written before the update transaction is deemed complete. Otherwise, the update transaction fails, and is rolled back, thereby preventing potential corruption of data stored on the DDSN.

In addition, while this application discusses DFS accesses in a unitary manner, accesses of multiple segments within a file could occur concurrently based on the capabilities of a particular grid client. For example, a powerful grid client with ample bandwidth and memory to store data could read or write multiple data segments in a single message and could utilize multiple threads or processes to perform such reads or writes. This would better utilize the network bandwidth and greatly increase performance in a high latency environment.

Figure 6:
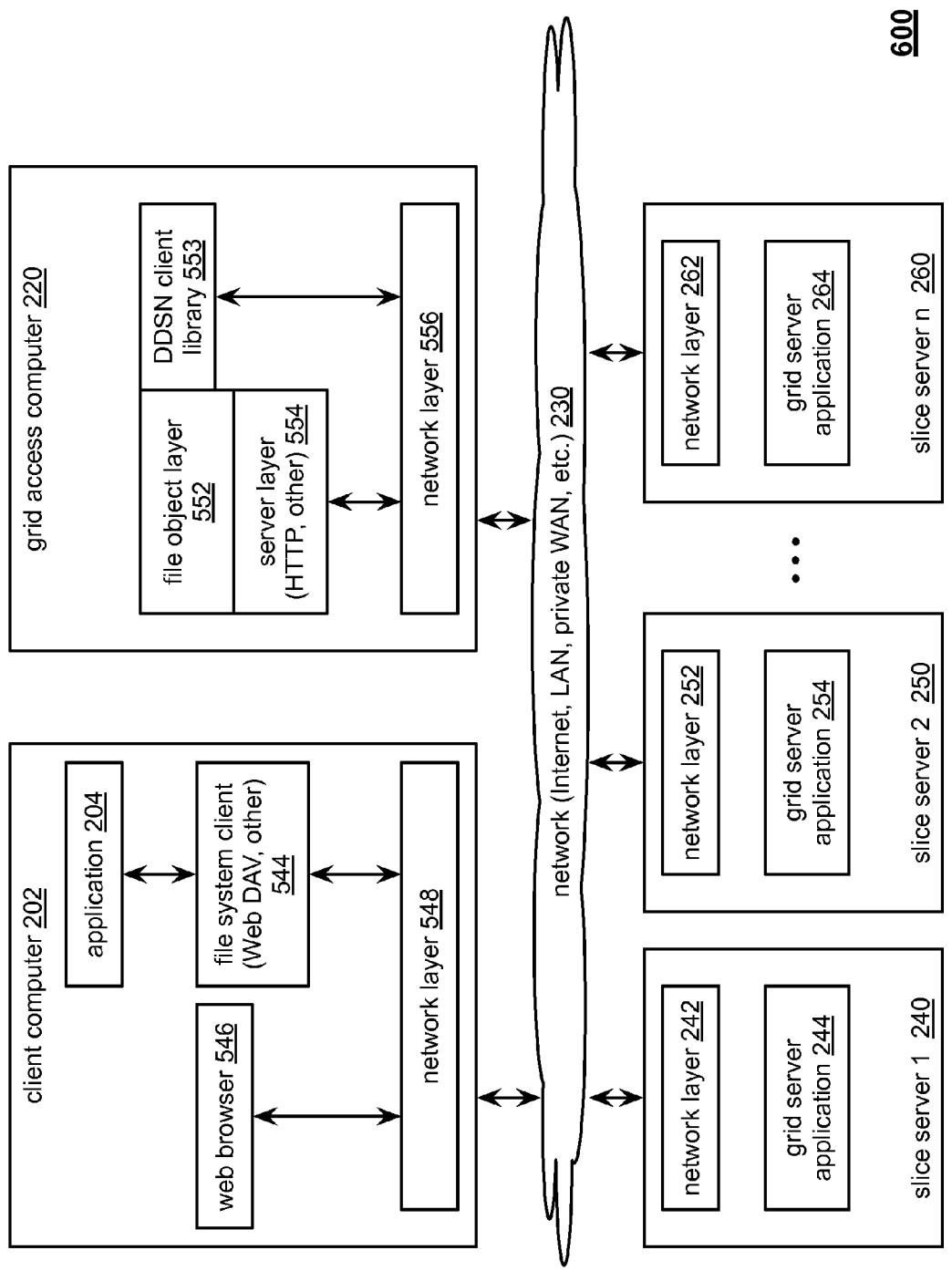
FIG. 6 is a block diagram illustrating the interoperation of different software components used to access dispersed data storage network using the disclosed File-Object interface and constructed in accordance with an embodiment of the disclosed invention.

Returning to the Figures, and to FIG. 6 in particular, a distributed computer system implementing a DDSN 600 is depicted. The illustrated system includes a client/user computer 202, a grid access computer 220 and some number of slice servers 240, 250, and 260. Within the client computer 202, an application program 204 accesses a networked file system 544, such as WebDAV, NFS, or some other networked file system. The networked file system 544 will issue commands to a network layer 212 operating on the client computer 548. Alternatively, a web browser 546 accessing a web page published by the grid access computer 220 may directly issue commands to the network layer 212.

The network layer 212 issues packets to the network 230 to carry out any received commands. File system commands will be routed to the grid access computer 220 where they will be processed by a network layer 224 operating thereon. Packets received by the network layer 224 may be passed to Server Layer 554, which, for file system related packets, will examine the packets and, based on the contents of the packets, issue commands to File-Object Layer 552. Server Layer 554 examines each packet passed to it by Network Layer 224 and, based on the requesting file system, e.g., NFS, WebDAV, etc., as well as the specific type of packet, will issue a command to the File-Object Layer 552. The File-Object Layer 552 presents a limited interface to the Server Layer 554, and effectively implements a virtual file system for nearly any type of networked file system for which an interface exists.

The File-Object Layer 552 issues commands to the Access Application 553, which implements an information dispersal algorithm in accordance with the received commands. For example, if a read command is received by the File-Object Layer 552, the Access Application 553 will issue network packets for transmission by Network Layer 224 to Slice Servers 240, 250, and 260 to carry out the read.

Figure 7:
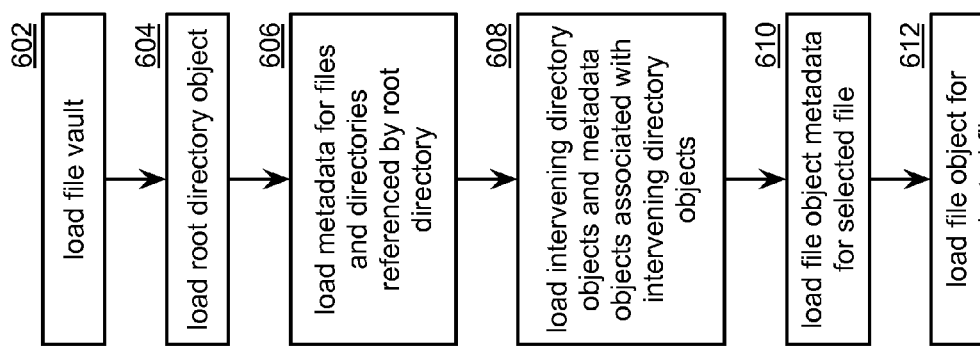
FIG. 7 is a flow chart illustrating at a high level how a file object is loaded by dispersed data storage network constructed in accordance with an embodiment of the disclosed invention.

FIG. 7 is a high-level flowchart illustrating how a file might be read using DFS. To start accessing DFS, a grid access computer, client computer, or some other device seeking access to the DDSN through DFS could load a particular file vault associated with the desired DDSN in step 602. In step 604, the root directory object would be loaded from the DDSN. Steps 602 and 604 would generally be performed on initialization, and would not need to be performed again. On the first access of a particular file vault step 606 would be executed, and metadata associated with files and directories listed in the root directory would be loaded from the DDSN.

In step 608, intervening directory objects, meaning those between the desired file and the root directory of the vault, would be read, along with the metadata associated with the intervening directory objects in step 608. Once the home directory of the desired file has been opened, the file object metadata associated with the desired file is loaded in step 610, and the file object itself is loaded in step 612. The desired file may then be manipulated.

Figure 8A:
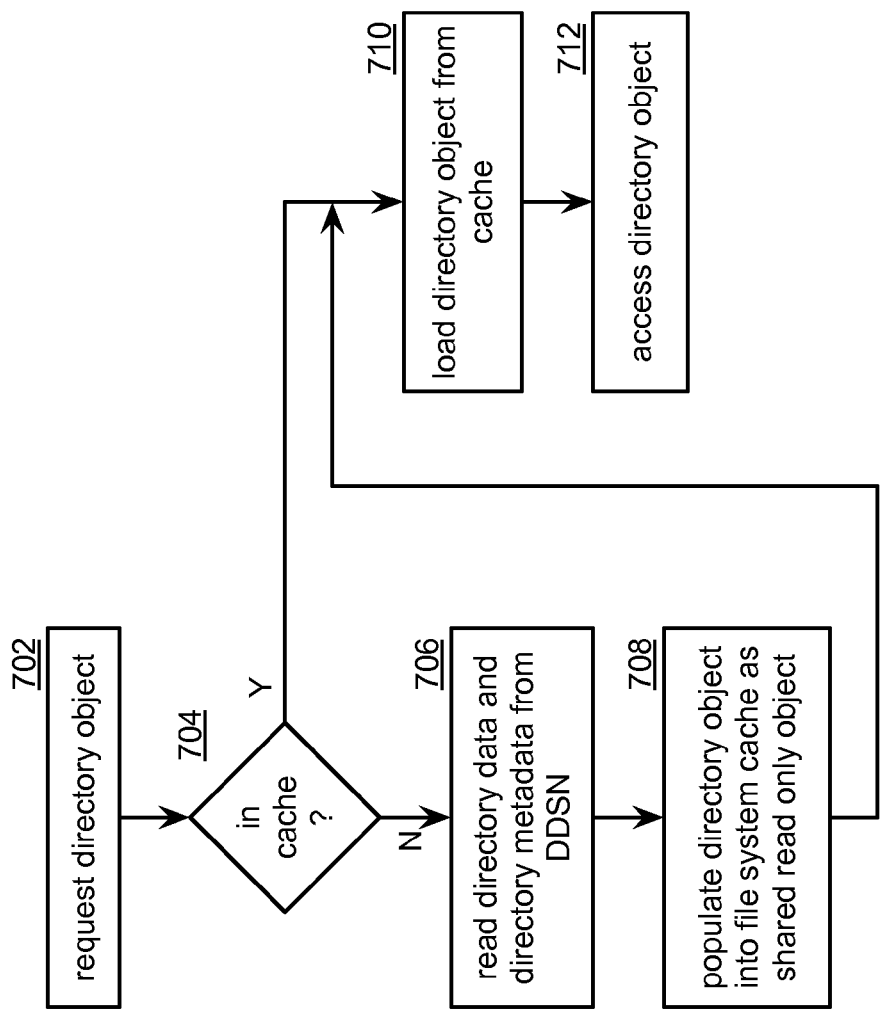
FIG. 8A is a flowchart illustrating how a directory object is loaded by a dispersed data storage network constructed in accordance with an embodiment of the disclosed invention.

FIG. 8A illustrates the process by which a directory object may be loaded into the file system cache and accessed. In step 702, a request is made for a particular directory object. This request could come from an application level program directly accessing DFS or a higher level file system interface. In step 704, a check is made to determine whether the requested directory object is resident within the file system cache. If it is, execution resumes at step 710. However, if it is not, the directory object and associated metadata object are read from the DDSN in step 706, and both are populated into the file system cache in step 708 as shared read only cache objects, meaning that any program may access the directory object and associated metadata object, but nether may be modified. In step 710, the directory object is loaded from the cache and accessed by the calling program in step 712.

Figure 8B:
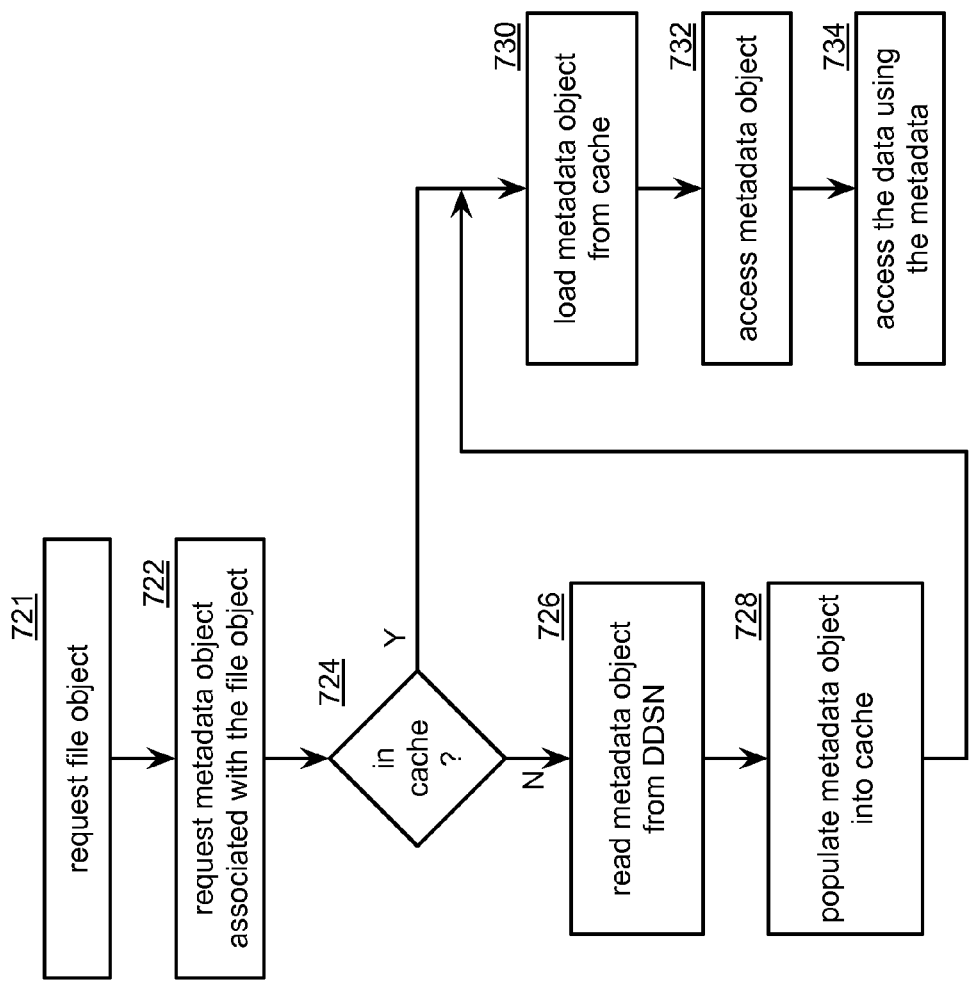
FIG. 8B is a flowchart illustrating how a file object is loaded by a dispersed data storage network constructed in accordance with an embodiment of the disclosed invention.

FIG. 8B illustrates the process by which a file object may be loaded into the file system cache and accessed. In step 721, a file object is requested. This request could also come for an application level program directly accessing DFS or a higher level file system interface. In step 722, a request is made for the metadata object associated with the desired file object. In step 724, a check is made to determine whether the requested metadata object is resident within the file system cache. If it is, execution resumes at step 730. However, if it is not, the metadata object is read from the DDS in step 726, and it is populated into the file system cache in step 728 as a shared read only cache object, meaning that any program may access the metadata object, but it may not be modified. In step 730, the metadata object is loaded from the cache and it is accessed by the calling program in step 732. In step 734, the requested file object may be accessed by the calling program through use of the file object identifier embedded within the metadata object.

Figure 9:
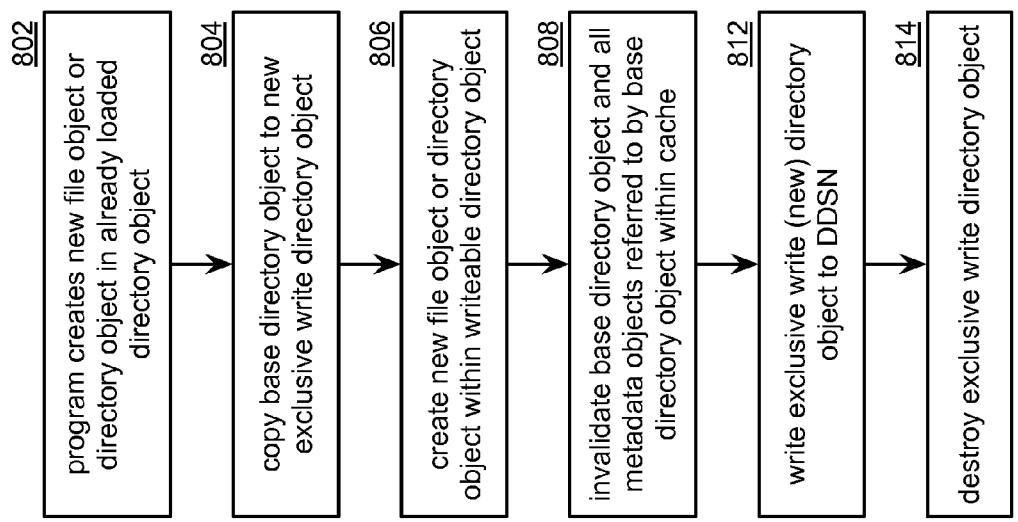
FIG. 9 is a flowchart illustrating the high level process of creating a file or directory object in accordance with an embodiment of the disclosed invention.

FIG. 9 illustrates how a file or directory could be created within an already loaded shared read only directory object. In step 802, a request is made to create a new file or directory within an already loaded directory. In step 804, the already loaded base directory object is copied into an identical exclusive write directory object. Other programs may continue to read the already loaded directory object from the file system cache. In step 806, the new file object or directory object is created within the exclusive write directory object. In step 808, the shared read only base directory object is invalidated within the file system cache along with metadata objects associated with any directory objects or file objects referred to by the base directory object. In step 812, the exclusive write directory object is written to the DDSN and, on confirmation of a successful write, destroyed within the file system cache in step 814.

Figure 10A:
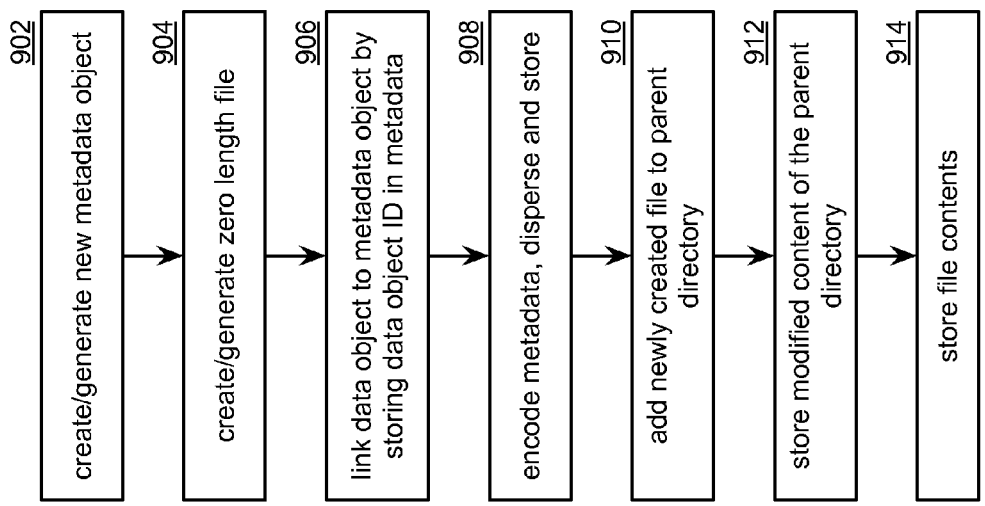
FIG. 10A is a flowchart illustrating the details of creation of a file object in accordance with an embodiment of the disclosed invention.

The procedure to create a virtual dispersed file on a DDSN is described in FIG. 10A. First, in step 902, an object representing metadata for the newly created file is generated and initialized with the metadata values, such as, for example, creation time. Then in step 904, a new data object is created representing the content of the file. As the file is new, the content is a zero length file object. In step 906, the two objects generated above are linked to each other by embedding the object ID of the data object in the metadata object. In step 908, these two objects are encoded using an information dispersal algorithm, segmented, dispersed and stored on the DDSN. Then, in step 910, the newly created file object is added to the parent directory object, and the metadata object of the parent directory is modified to reflect the new size of the parent directory. In step 912, the modified directory object and metadata object of the parent directory are segmented, dispersed and stored on the DDSN. Finally, in step 914, the contents of the file are stored to DDSN.

Figure 10B:
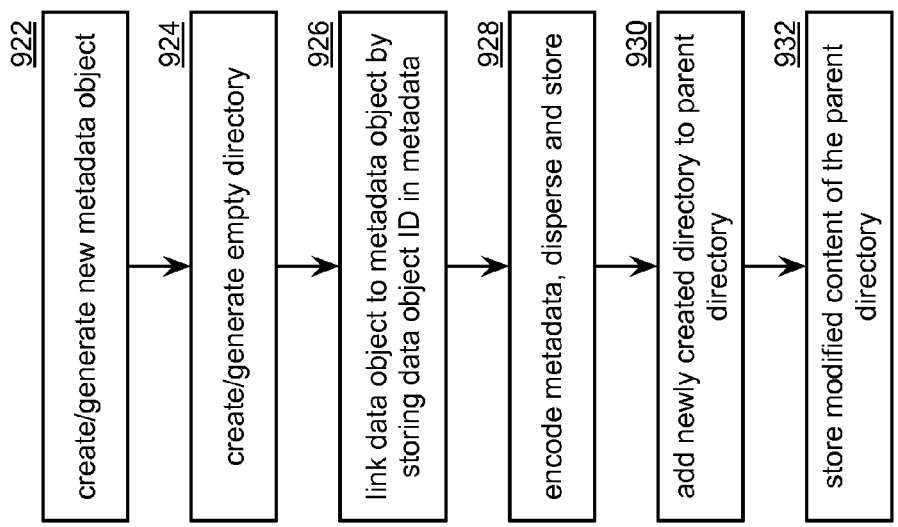
FIG. 10B is a flowchart illustrating the creation of a directory object in accordance with an embodiment of the disclosed invention.

The procedure to create a virtual dispersed directory on a DDSN is described in FIG. 10B. First, in step 922, an object representing metadata for the newly created directory is generated and initialized with the metadata values, such as, for example, creation time. Then in step 924, a new data object is created representing the content of the directory. As the directory is new, it will be an empty list of files and directories contained within the directory. In step 926, the two objects generated above are linked to each other by embedding the object ID of the directory object in the metadata object. In step 928, these two objects are segmented and dispersed using an information dispersal algorithm, and stored on the DDSN. Then, in step 930, the newly created directory object is added to the parent directory object, and the metadata object of the parent directory is modified to reflect the new size of the parent directory. Finally, in step 932, the modified directory object and metadata object of the parent directory are segmented, dispersed and stored on the DDSN.

Another feature of the disclosed file system is the ability to store variable sized data segments to a DDSN, as opposed to fixed sized blocks or segments. In particular, the disclosed file system segments a collection of data into one or more data segments. These data segments may be of the same size. Alternatively, a segmentation strategy may be employed whereby variable sized data segments are created. One strategy would be to use relatively small data segments near the beginning of a collection of data, and to increase the size of the data segments as data stored later within the collection of data was processed. This would allow for quicker access to data stored near the beginning of a collection of data with the offsetting disadvantage of increased network traffic due to additional requests to the DDSN.

The segmentation strategies described above would be particularly well suited for use when accessing a streaming media presentation. The smaller segment size used for the initial portions of the presentation would be accessed quickly, allowing the stream to start faster and a buffer of media content to be created. Later portions of the presentation would be accessed using larger segment sizes, thereby minimizing network traffic as the remainder of the presentation was viewed.

While segmenting a collection of data is generally desirable as segmentation enhances random access performance within a collection of data, certain collections of data, such as file system objects, file system metadata objects, and other collections of data are not of use unless the entire collection of data in question is available. In such a case, a flag may be associated with a collection of data indicating that the collection of data should not be segmented. This flag may be exported to a DFS user or the flag may be for use only by the DFS itself.

Figure 11A:
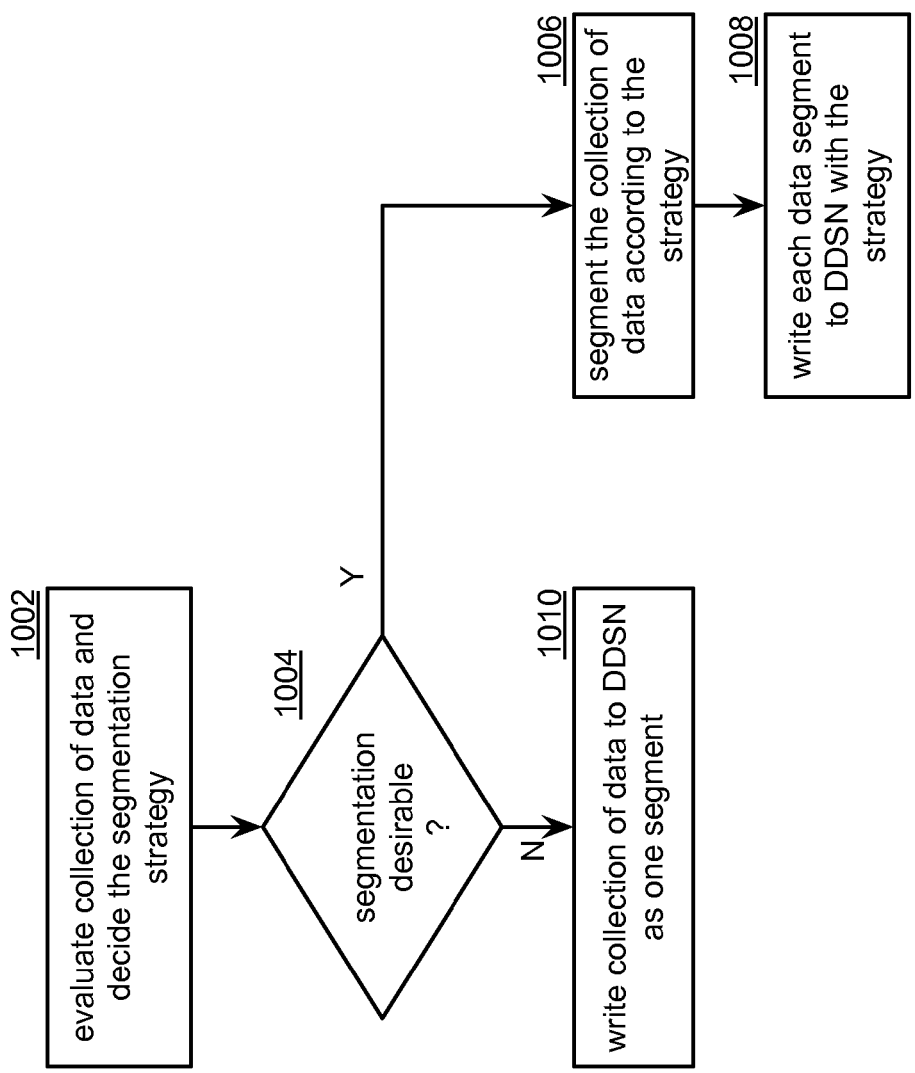
FIG. 11A is a flowchart illustrating the segmenting of a file or directory object before writing, in accordance with an embodiment of the disclosed invention.

FIG. 11A shows the segmentation of a file, directory or other collection of data before it is stored on the DDSN. In step 1002, the data to be stored is evaluated on various criteria to determine the best segmentation strategy. This could include size, need for random access, type of access or client, or other criteria that could affect performance or storage. Based on these criteria, it is determined whether segmentation is desirable in step 1004. If segmentation is not desirable, such as, for example, for a metadata object, the collection of data is written to the DDSN as one segment in step 1010. However, if segmentation is desirable, the collection of data is segmented according to the selected segmentation strategy in step 1006. In step 1008, each data segment is written to the DDSN.

Figure 11B:
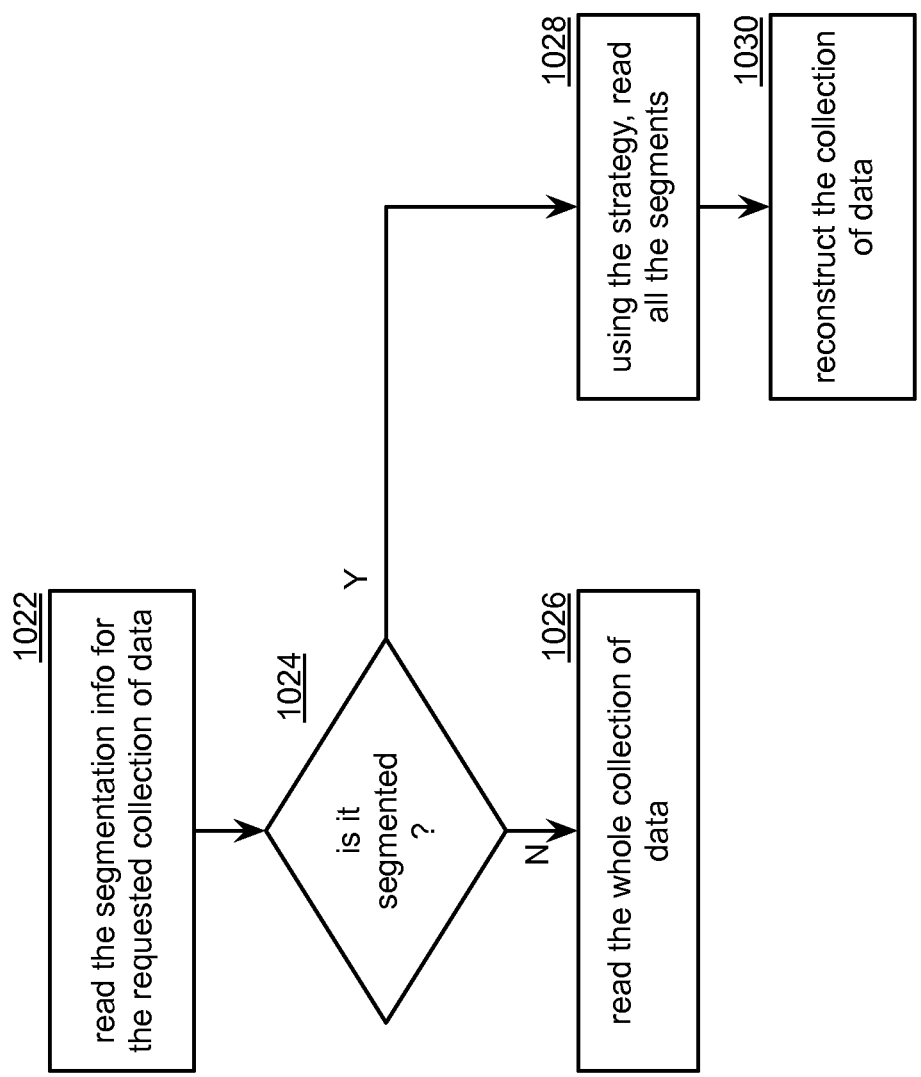
FIG. 11B is a flowchart illustrating the reconstructing of segmented data during a read, in accordance with an embodiment of the disclosed invention.

FIG. 11B shows the reconstitution of segmented data when it is retrieved from the DDSN. In step 1022, the segmentation information for the requested collection of data is retrieved, and a determination of whether or not the collection of data is segmented is made in step 1024. If the collection of data is not segmented, the entire collection is read in step 1026. However, if the collection of data is segmented, all of the segments are retrieved in accordance with the segmentation information in step 1028. In step 1030, the collection of data is reconstructed, and returned.

Detailed Description of the Object Storage Interface to a Dispersed Data Storage Network The object-based storage interface disclosed herein is especially designed to access a dispersed data storage network ("DDSN"), and provides a mechanism for DDSN users to store arbitrary sized objects, unlike previously disclosed block-based interfaces, and without the overhead required of a file interface. Furthermore, the disclosed object-based storage interface, or Dispersed Object Storage Network ("DOSN") is completely distributed and can be scaled to very large networks with virtually no limitations.

Figure 12:
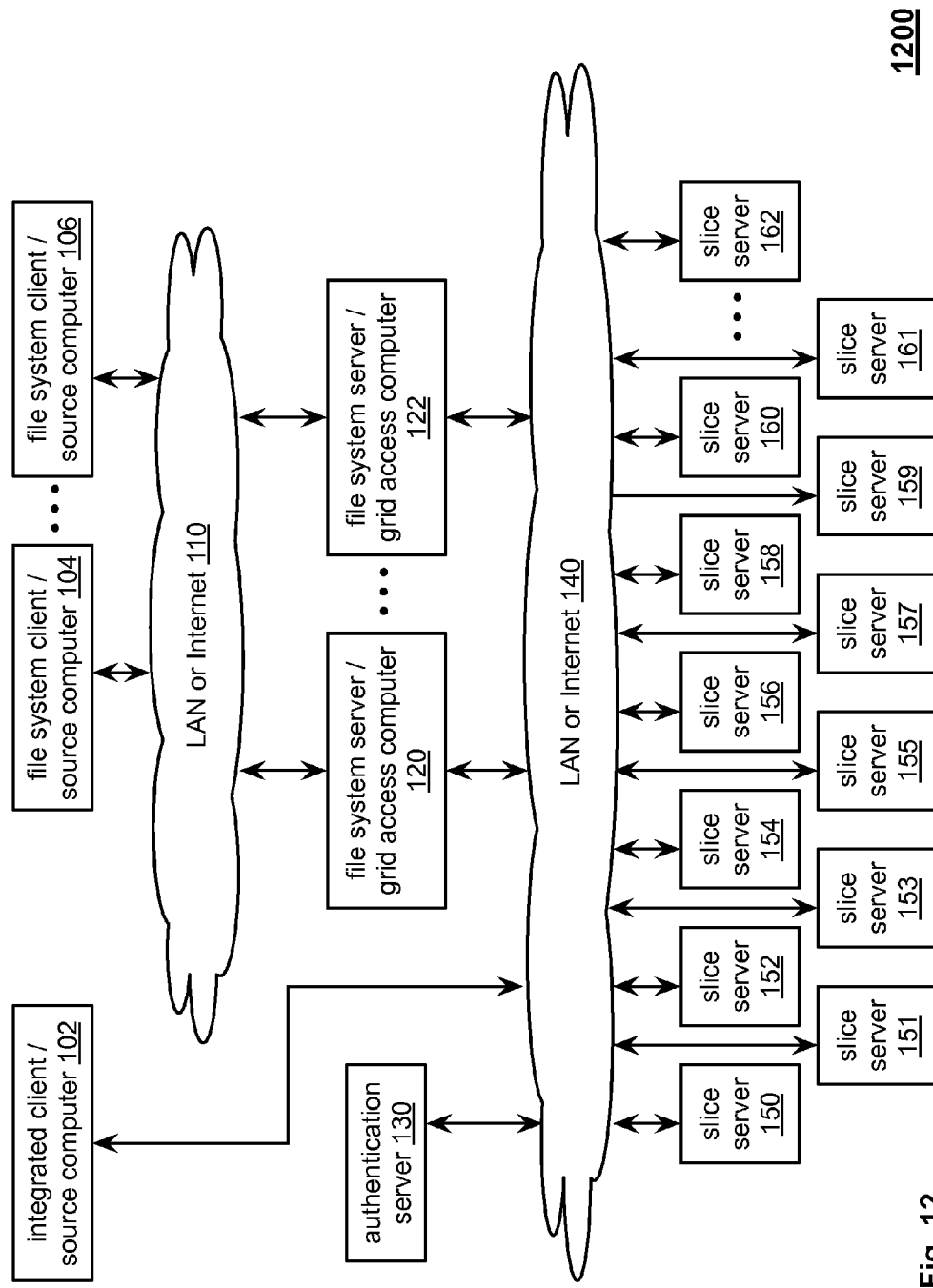
FIG. 12 is a network diagram of a dispersed data storage network constructed in accordance with an embodiment of the disclosed invention.

Turning to the Figures, and to FIG. 12 in particular, a distributed computer system implementing a DDSN 1200 is shown. An arbitrary number of slice servers 150-162 store data slices sent to them by networked client computers 102, 104, and 106. Clients 104 and 106 are known as accesser clients as they access the DDSN through a grid access computer 120, which includes software for translating object access requests from access clients 104 and 106 into DDSN commands. Client 102 is known as an integrated client, as it is able to access the DDSN using software wholly running on the integrated client 102.

Figure 13:
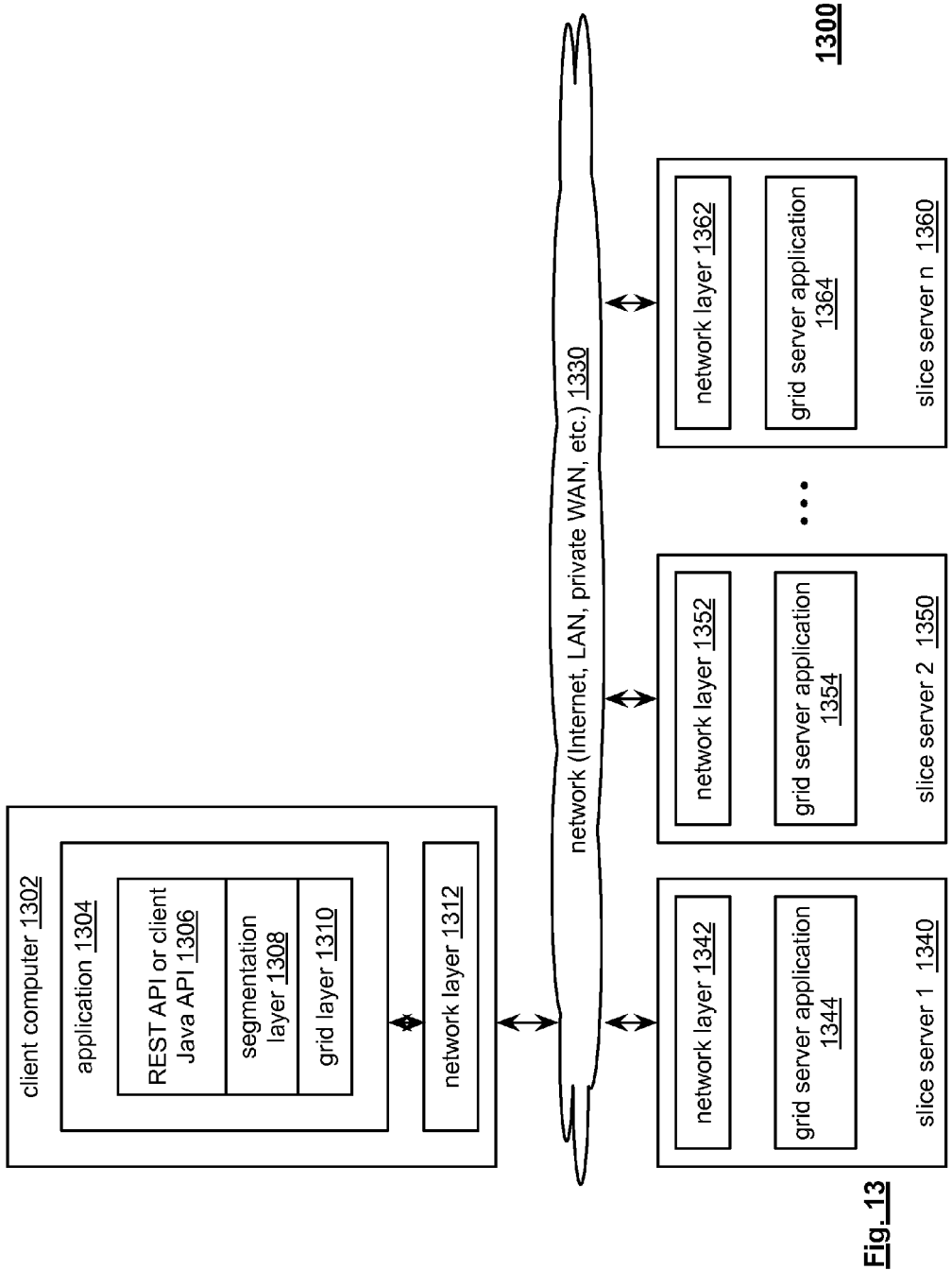
FIG. 13 is a block diagram illustrating the interoperation of different software components used to implement a dispersed data storage network constructed in accordance with an embodiment of the disclosed invention.

As explained herein, the disclosed invention allows a DDSN to store and retrieve data objects, which are essentially an arbitrary amount of data along with one or more attributes, such as the length of the data. FIG. 13 illustrates a distributed computer system implementing a dispersed data storage network 1300. The illustrated system consists of a client/user computer 1302, a network 1330, and some number of slice servers 1340, 1350, and 1360. A dispersed data storage application 1304 operates on the client computer 1302. The dispersed data storage application 1304 utilizes a client API, such as a Client Java API 1306, which includes commands to write and retrieve data objects. The Client Java API 1306 accesses a segmentation layer 1308, which contains routines and objects necessary to disperse or integrate data read or written from the DDSN. The segmentation layer 1308 in turn accesses a grid layer 1310, which contains routines and objects necessary to access the slice servers 1340, 1350, and 1360. Finally, the grid layer 1310 issues network commands through a network layer 1312 provided by an operating system.

The slice servers 1340, 1350, and 1360 receive access messages over the network 1330 using a network layer 1342, 1352, and 1362 provided by an operating system resident on each slice server 1340, 1350, and 1360. As explained previously, when discussing Cleversafe's block-based access protocol and file access protocol, each slice server comprises a grid server application 1344, 1354, and 1364, which interprets network commands storing or retrieving data slices.

Figure 14A:
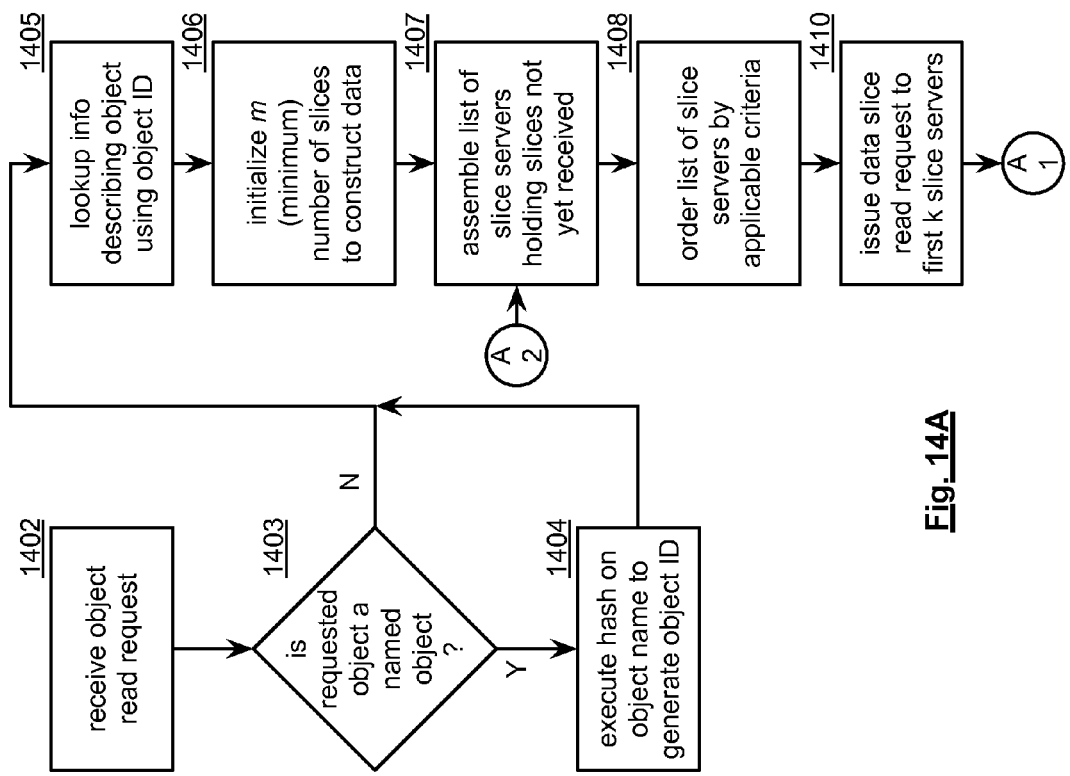
FIGS. 14A-14C collectively illustrate a read operation from a dispersed data storage network constructed in accordance with an embodiment of the disclosed invention.
Figure 14C:
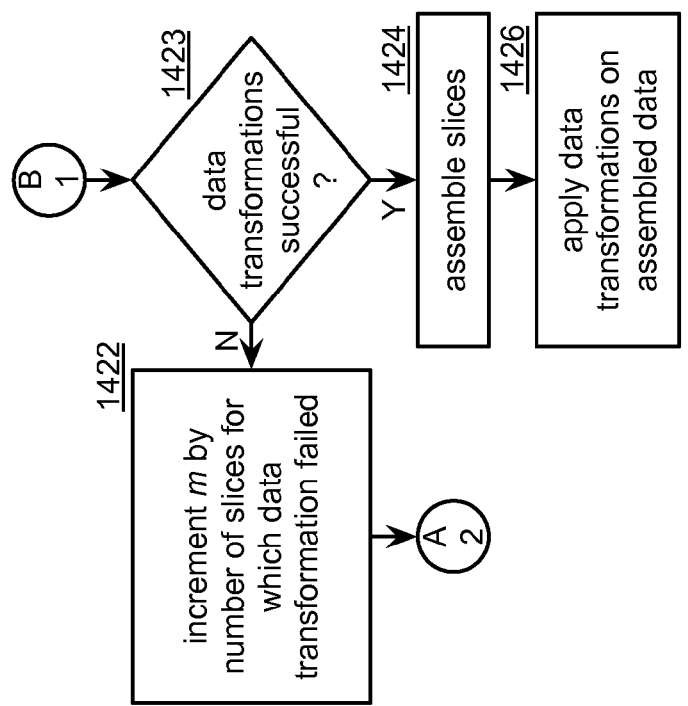
Figure 14B:
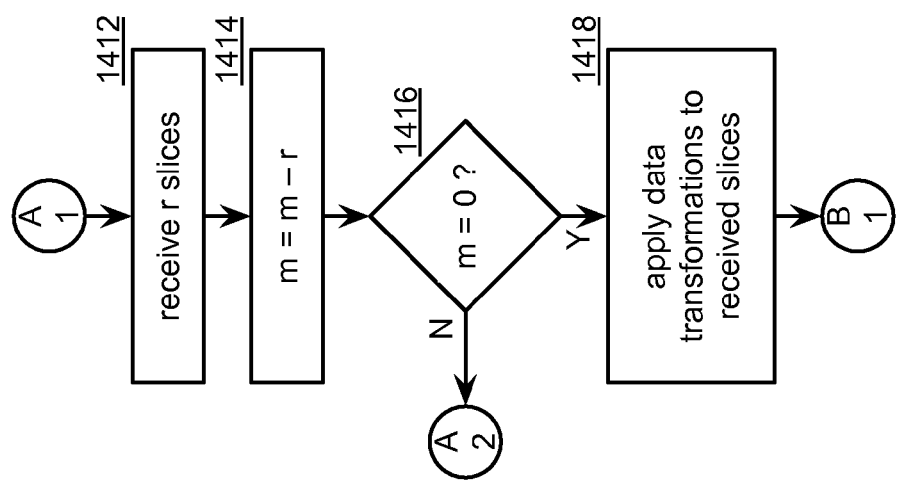

FIGS. 14A-14C show the process by which a data object is read from a DDSN constructed in accordance with the disclosed invention. In step 1402, a read request is received. In step 1403, it is determined if the read request specifies an object identifier or an object name. If an object name is specified, a hashing function is applied to the object name in step 1404 to generate an object identifier. In any case, a database is accessed using the object identifier in step 1405 to retrieve an information record specifying information regarding the slice servers storing data slices associated with the data object as well as other pertinent information about the data object. Further information on one method that can be used to associate data requests with particular slice servers is contained in U.S. patent application Ser. No. 11/973,621, titled "Virtualized Data Storage Vaults on a Dispersed Data Storage Network," filed on Oct. 9, 2007 assigned to Cleversafe, Inc., and hereby incorporated by reference in its entirety. In step 1406, the variable m is initialized to the minimum number of slices required to construct the requested data object. As described herein, for each successfully received and validated slice, m is decremented.

In step 1407, a list of slice servers each holding one required data slice that has yet to be received is assembled, and in step 1408, the list is ordered by any applicable criteria. Further information on criteria by which the list may be ordered is contained in U.S. patent application Ser. No. 11/973,622, titled "Smart Access to a Dispersed Data Storage Network," filed on Oct. 9, 2007, assigned to Cleversafe, Inc., and hereby incorporated by reference in its entirety. In step 1410, read requests are issued to the first k slice servers on the assembled list, where k is at least equal to m, the minimum number of data slices needed to reconstruct the requested data object, but could be as large as n, the number of data slices that have data relevant to the requested data object. In step 1412, r data slices are received, and in step 1414, the number of received data slices r is subtracted from the variable m. Note that the number of received data slices r may be smaller than the number of requested data slices k. In step 1416, m is compared to zero, and if m is not equal to zero, execution returns to step 1407, and execution proceeds as normal from there. However, if m is equal to zero, a collection of data transformations may optionally be applied to the received slices in step 1418. The applied data transformations can include decryption, decompression, and integrity checking. For example, each data slice may have a cyclical redundancy check ("CRC"), or other form of checksum appended to the data contained in the slice. This checksum could be compared against a checksum calculated against the received data to ensure that the data was not corrupted while it was stored or during the transmission process.

In step 1420, it is determined if the applied data transformations were successful for all of the received data slices. If the applied data transformations were not successful for some of the received slices, m is incremented by this number in step 1422, and execution is resumed at step 1407. The data transformations could fail, for example, if an integrity check revealed that a received data slice may be corrupted. However, if the applied data transformations were successful for all received data slices, the received slices are assembled into the requested data object in step 1424. The same or different data transformations may optionally be applied to the assembled data object in step 1426, which completes the read process.

Figure 15A:
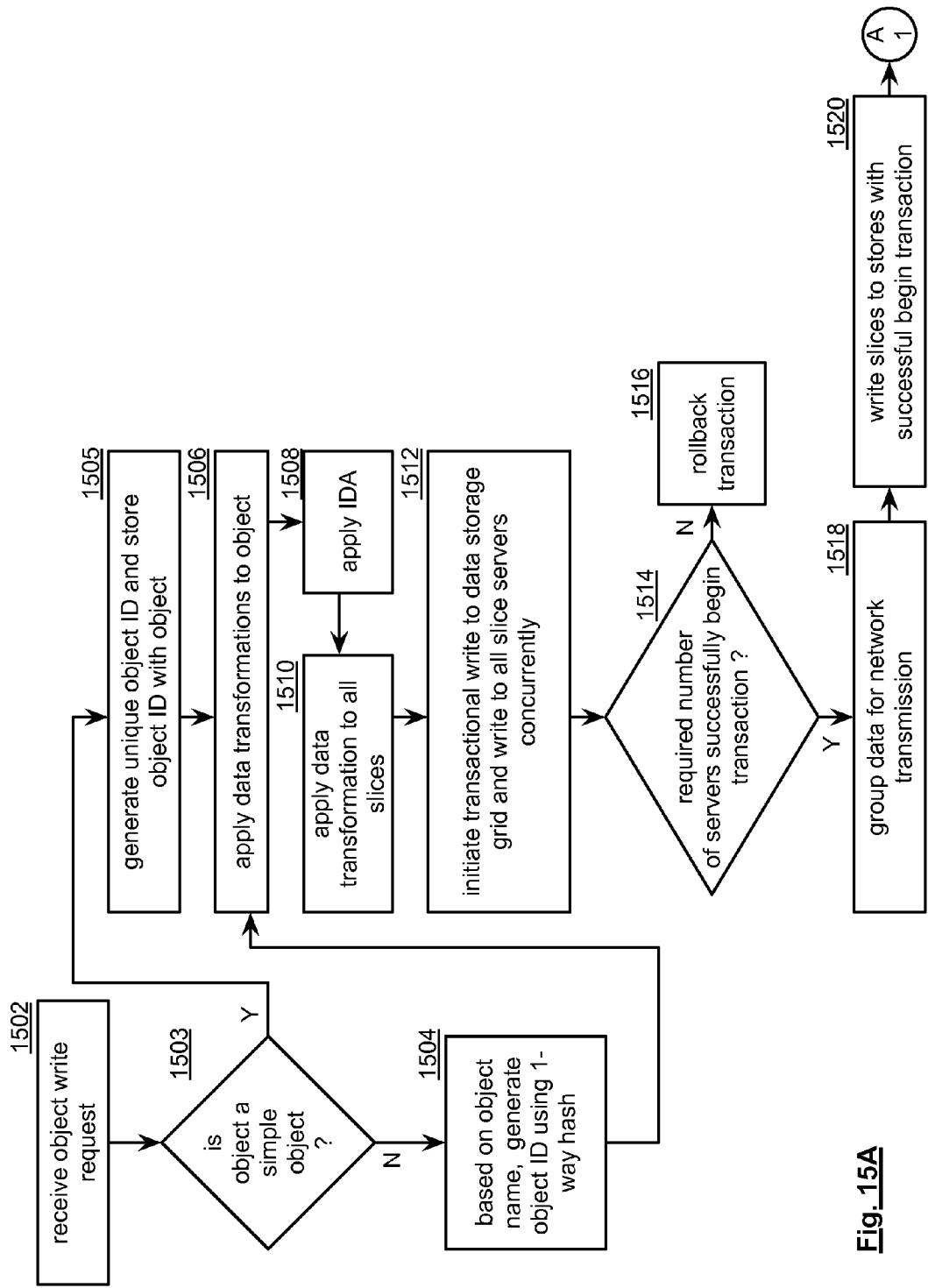
FIGS. 15A-15B collectively illustrate a write operation from a dispersed data storage network constructed in accordance with an embodiment of the disclosed invention.
Figure 15B:
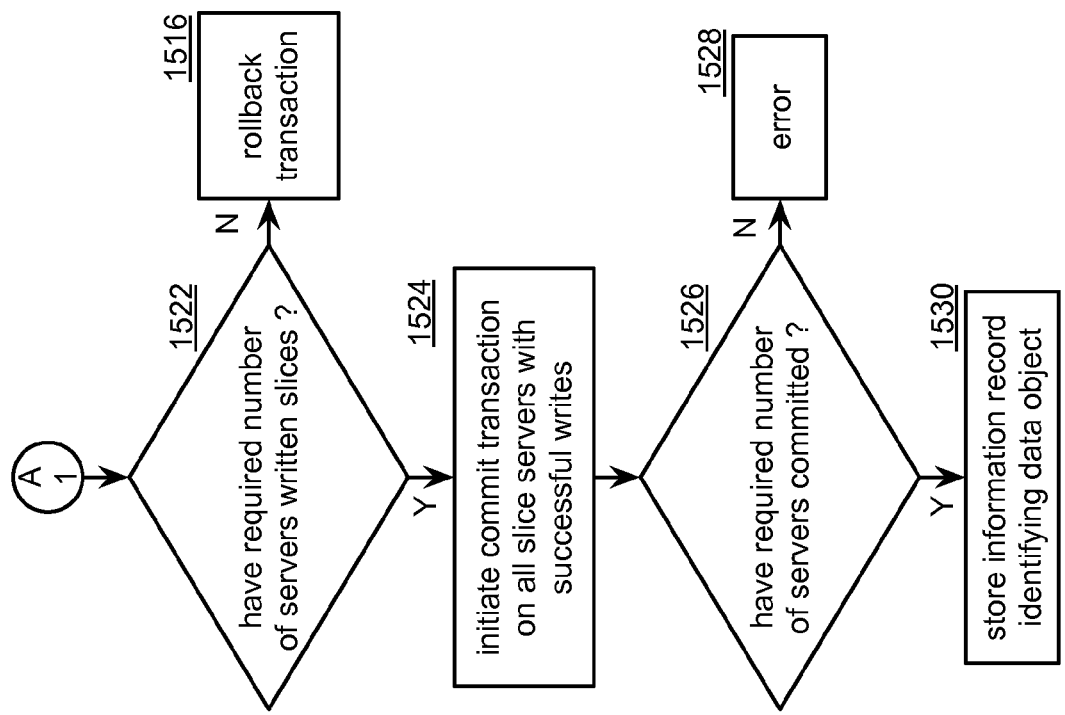

In FIGS. 15A-15B, the process by which a data object may be written to a DDSN constructed in accordance with the disclosed invention is illustrated. In step 1502, a write request specifying the data object to be written is received. In step 1503, it is determined whether the data object to be written is a simple data object. If so, a data object identifier is randomly generated in step 1505. Otherwise, a data object identifier is generated based on a supplied name in step 1504 using a hashing function. In step 1506, any required data transformations are applied to the data object, and in step 1508, the data object is sliced into a plurality of data slices using an information dispersal algorithm. In step 1510, any required data transformations are applied to the resultant data slices.

In the disclosed system, writes are performed transactionally, meaning that all data slices must be successfully written before a write is deemed complete. In step 1512, a write transaction is initiated to the DDSN. As discussed herein, all slice servers are simultaneously contacted, and in step 1514, a confirmation that at least n receiving slice servers are prepared to begin the write transaction must be received, or the transaction is rolled back in step 1516.

In step 1518, data is grouped for transmission, and in step 1520, data slices are transmitted to the slice servers that indicated their ability to receive and store slices. The number of slice servers that successfully received and stored their assigned data slices is checked in step 1522, and if less than n slices are successfully stored, the transaction is rolled back in step 1516. In step 1524, a commit transaction is begun on all servers with successful writes. If the commit transaction fails, an error is logged in step 1528. Finally, in step 1530, an information record is written to a database identifying the stored data object, as well as information required to reconstruct the data object.

The disclosed DOSN is able to read and write dispersed data objects as either Simple Dispersed Objects ("SDO") or Named Dispersed Objects ("NDO"). SDOs and NDOs differ depending on how they were created/generated by Application 1304. As described in more detail below, both SDOs and NDOs are identified by a unique ID to avoid naming conflicts between multiple users of the disclosed DOSN.

A SDO has a unique ID, either automatically generated by application 1304 or entered by a user of client computer 1302. This unique ID allows the user of the disclosed DOSN to simply specify the appropriate ID when writing or retrieving SDOs to or from the DOSN. The following are abstract operations supported by a SDO:
1) To create a SDO with an ID provided by a user
"sdo=new SimpleDispersedObject (ID, gridController)"
2) To create a SDO with an automatically generated ID
"sdo=new SimpleDispersedObject (gridController)"
3) To write the dispersed SDO from the data stream on the DOSN and associate it with the ID
"sdo.put (<datastream>)"
4) To read the dispersed SDO by connecting an input stream to the dispersed SDO stored on the DOSN
"datastream=sdo.get( )"
5) To delete the SDO from the DOSN
"sdo.remove( )"

Because all data objects stored as SDOs are referenced by a unique ID, conflict issues such as when multiple users try to store data on a dispersed network are avoided. However, if a user wants to be able to refer to a SDO by a more meaningful name than a random ID, the user may require an external entity for mapping all unique IDs to names and vice versa. Furthermore, if a user wants to find/search her SDOs in accordance with certain criteria, the mapping entity external from the DOSN must be able to also store additional metadata associated with the respective data contained in the SDO.

Unlike a SDO, a user can reference a NDO simply by giving it a human readable name, instead of a unique ID. In the disclosed DOSN, application 1304 takes the user-designated name for a data object and automatically generates a unique ID. The ID generated for a NDO may be generated, for example, by using a one-way hash function. The main advantage of a NDO is that the user can more easily reference her data objects by meaningful names as opposed to a random ID that is likely meaningless to a user. Furthermore, the required mappings between names and associated IDs do not need to be stored at an entity external to the DOSN, because it is built into the hashing.

The following are abstract operations supported by a NDO:
1) To create a NDO
"ndf=new NamedDispersedObjectFactory (gridController)"
"ndo=ndf.create (String objectName)"
2) To write the dispersed NDO from the data stream on the DOSN under the given name
"ndo.put (<datastream>)"
"ndo.put (File localFile)"
3) To read the NDO by connecting an input stream to the dispersed NDO stored on the DOSN
"InputStream ndo.get( )"
4) To delete the dispersed NDO that is stored on the DOSN under the name
"objectName"
"ndf.remove (String objectName)"

Because NDOs allow users to reference data objects by names instead of unique IDs, provisions must be made to avoid naming conflicts, namely that different data objects are referenced by the same name, either by the same user or by multiple users of a DOSN. These naming conflicts can potentially occur with any kind of hashing techniques. Therefore, an additional level of indirection (i.e., the ability to reference a data object using a name, reference, or container instead of the value itself) to reference the actual data object may be provided.

For example, object name to object ID mapping may compute/generate an object ID that stores a map of object names to "real" object IDs, whereby the "real" object ID is associated with the user's actual data object. These "real" object IDs would be generated internally by application 204 and would not be visible to the user client. In instances where more than one name is mapped to the same object ID, the object ID may store a list of pairs that could map, for example, as follows:

```
"<name1> <-><object-id-1>"
"<name2> <-><object-id-2>"
etc.
```

In another example to provide another level of indirection, writing/storing a NDO could be a two-step process. This process can be illustrated as a dispersed hash-table where object names are keys that map to containers, whereby each container stores all the object names that map to the same object ID. More specifically, first the application 1304 would generate an object ID based on the object name designated by the user "to get to the container". Next, the application 1304 generates the actual NDO that contains the data and updates the container with the new mapping entry for the object name and real object ID. Of course every read and delete operation would have to follow a similar two-step process.

While NDOs are more user friendly than SDOs, in that they offer a meaningful name designation and do not require the user client to maintain an external entity to manage metadata, they are potentially susceptible to conflicts when multiple user clients try to store data objects on the same DOSN. Particularly, a contention between two or more user clients may be caused during the update of the NDO container when two or more different user clients simultaneously store data objects on the same DOSN and the two or more respective object names coincidentally happen to map to the same container due to a hash collision.

One possible solution to avoid this potential conflict is to reserve a field in the object ID at the time of generating the object ID from the user designated object name, to store a writer ID unique to the user client who stores the respective object data. The writer ID is then used to utilize different containers for different unique writer IDs.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for execution by a computing device, the method comprises:

assigning a data object identifier (DOI) to a data object;
partitioning a data object into a plurality of blocks;
encoding the plurality of blocks using an information dispersal algorithm to generate a plurality of sets of data slices, wherein a first set of the plurality of sets of data slices is generated from a first block and a second set of the plurality of sets of data slices is generated from a second block;
transmitting the plurality of sets of data slices to a plurality of slice servers within a dispersed data storage network, wherein a first data slice of a first set of the plurality of sets of data slices and a first data slice of a second set of the plurality of sets of data slices are transmitted to a first slice server, wherein a second data slice of the first set of the plurality of sets of data slices and a second data slice of the second set of the plurality of sets of data slices are transmitted to a second slice server, wherein each data slice within each set of the plurality of sets of data slices is transmitted to a different slice server of the plurality of slice servers;
generating an information record for the data object for use to retrieve a minimum number of data slices of the plurality of sets of data slices required to reconstruct the data object, wherein the information record specifies the DOI for the data object, identity of each block of the plurality of blocks, identity of each set of the plurality of sets of data slices, and identity of each data slice within the plurality of sets of data slices, wherein each data slice is also identified by that corresponding set of the plurality of sets of data slices and that corresponding block of the plurality of block from which that that data slice was generated; and
transmitting the information record, which identifies the data object, for storage in a database within the dispersed data storage network.

2. The method of claim 1 further comprising:
accepting a name; and
generating the (DOI) from the name using a hashing function.

3. The method of claim 1 further comprising:
randomly generating the (DOI) based on a randomly generated number.

4. A dispersed data storage unit comprises:
a network port;
a dispersed data storage application configured to:
assign a data object identifier (DOI) to a data object;
partition a data object into a plurality of blocks;
encode the plurality of blocks using an information dispersal algorithm to generate a plurality of sets of data slices, wherein a first set of the plurality of sets of data slices is generated from a first block and a second set of the plurality of sets of data slices is generated from a second block;
transmit, via the network port, the plurality of sets of data slices to a plurality of slice servers within a dispersed data storage network, wherein a first data slice of a first set of the plurality of sets of data slices and a first data slice of a second set of the plurality of sets of data slices are transmitted to a first slice server, wherein a second data slice of the first set of the plurality of sets of data slices and a second data slice of the second set of the plurality of sets of data slices are transmitted to a second slice server, wherein each data slice within each set of the plurality of sets of data slices is transmitted to a different slice server of the plurality of slice servers;
generate an information record for the data object for use to retrieve a minimum number of data slices of the plurality of sets of data slices required to reconstruct the data object, wherein the information record specifies the DOI for the data object, identity of each block of the plurality of blocks, identity of each set of the plurality of sets of data slices, and identity of each data slice within the plurality of sets of data slices, wherein each data slice is also identified by that corresponding set of the plurality of sets of data slices and that corresponding block of the plurality of block from which that that data slice was generated; and transmit, via the network port, the information record, which identifies the data object, for storage in a database within the dispersed data storage network.

5. The dispersed data storage unit of claim 4, wherein the dispersed data storage application is further configured to:
   generate the (DOI) by applying a hashing function to a name.

6. The dispersed data storage unit of claim 4, wherein the dispersed data storage application is further configured to:
   generate, via a randomly generated process, the (DOI) based on a randomly generated number.

\* \* \* \* \*